(12) United States Patent
Masanek, Jr.

(10) Patent No.: US 10,464,491 B1
(45) Date of Patent: Nov. 5, 2019

(54) TRAILER HITCH STEP ASSEMBLY

(71) Applicant: MACNEIL IP LLC, Bolingbrook, IL (US)

(72) Inventor: Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 0 days.

(21) Appl. No.: 16/154,892

(22) Filed: Oct. 9, 2018

(51) Int. Cl.
*B60R 3/00* (2006.01)
*F16B 5/02* (2006.01)
*B60D 1/52* (2006.01)

(52) U.S. Cl.
CPC ............... *B60R 3/007* (2013.01); *B60D 1/52* (2013.01); *F16B 5/02* (2013.01)

(58) Field of Classification Search
CPC ....................................................... B60R 3/007
See application file for complete search history.

(56) References Cited

U.S. PATENT DOCUMENTS

| | | |
|---|---|---|
| 247,116 A | 9/1881 | Sawyer |
| 287,870 A | 11/1883 | Sawyer |
| 3,329,443 A | 7/1967 | Lowder et al. |
| 3,408,665 A | 11/1968 | Harris |
| 3,992,047 A | 11/1976 | Barenyi et al. |
| 4,231,583 A | 11/1980 | Learn |
| D296,431 S | 6/1988 | Yont |
| 4,943,076 A | 7/1990 | Tripke |
| D315,134 S | 3/1991 | Springer |
| D370,452 S | 6/1996 | Beasley |
| 5,738,362 A * | 4/1998 | Ludwick .................. B60R 3/02 280/166 |
| 6,145,861 A | 11/2000 | Willis |
| 6,485,597 B1 | 11/2002 | Warnecke et al. |
| 6,511,086 B2 | 1/2003 | Schlicht |
| 6,513,821 B1 | 2/2003 | Heil |
| 6,588,781 B2 | 7/2003 | Pohill et al. |
| D491,509 S * | 6/2004 | Bundy ........................ D12/203 |
| 6,896,303 B1 | 5/2005 | Mohr |
| D511,319 S | 11/2005 | Wang |
| D513,217 S | 12/2005 | Daws et al. |
| D527,323 S | 8/2006 | Storer |
| D549,623 S | 8/2007 | Gaddy |
| 7,661,693 B1 * | 2/2010 | Lipski ...................... B60D 1/06 280/164.1 |
| 7,954,836 B2 * | 6/2011 | Mann ....................... B60R 3/02 280/163 |
| D652,775 S | 1/2012 | Spera |
| 8,851,495 B1 | 10/2014 | Masanek et al. |
| D723,443 S | 3/2015 | Anderson et al. |
| D788,669 S * | 6/2017 | Guo ........................... D12/203 |

(Continued)

*Primary Examiner* — Brian L Swenson
(74) *Attorney, Agent, or Firm* — Perkins IP Law Group LLC; Jefferson Perkins

(57) ABSTRACT

A post of a trailer hitch step assembly has a front portion adapted for insertion into a standard square hollow trailer hitch receiver and a rear portion that closely fits to a socket formed in a step body of the assembly. The height of the step body is greater than the height of the post, permitting the post to be affixed to the step body with the aid of screws threading into threaded bores that upwardly extend from the socket ceiling. Planar facets of the rear portion of the post and of the socket coact to resist torsional forces imposed on the step body around any of three axes.

12 Claims, 10 Drawing Sheets

FIG. 7

(56) References Cited

U.S. PATENT DOCUMENTS

| | | |
|---|---|---|
| 2003/0006576 A1 | 1/2003 | Lanoue et al. |
| 2003/0011164 A1 | 1/2003 | Cipolla |
| 2003/0085544 A1 | 5/2003 | Heil et al. |
| 2003/0116938 A1* | 6/2003 | Shields .................. B60R 3/007 280/166 |
| 2005/0062252 A1 | 3/2005 | Vincent |
| 2005/0067741 A1 | 3/2005 | Chapman et al. |
| 2006/0145516 A1 | 7/2006 | Yamamoto |
| 2006/0249924 A1 | 11/2006 | Armstrong et al. |
| 2009/0121449 A1 | 5/2009 | Kuntze et al. |
| 2010/0294819 A1 | 11/2010 | Spera |
| 2014/0001781 A1 | 1/2014 | Leking |
| 2014/0054874 A1 | 2/2014 | Masanek, Jr. |
| 2015/0108733 A1 | 4/2015 | Masanek et al. |
| 2015/0292668 A1 | 10/2015 | Abbasov et al. |
| 2017/0121525 A1 | 5/2017 | Luo et al. |
| 2017/0157817 A1 | 6/2017 | Lee et al. |
| 2017/0259477 A1 | 9/2017 | Bland |

\* cited by examiner

TRAILER HITCH STEP ASSEMBLY

BACKGROUND OF THE INVENTION

Many pickup trucks, sport utility vehicles and automobiles are fitted with a trailer hitch receiver. These receivers were originally designed to receive a tongue of a trailer. A type of trailer hitch receiver common in North America takes the form of a hollow square steel tube that may have an internal dimension across opposed side walls of 2 inches, or, in a light-duty version, of 1.25 inches.

Subsequently, these trailer hitch receivers have been used to mount all manner of accessories from the rear of the vehicle. One class of these accessories is hitch steps, by which a user of a vehicle may gain convenient access to the vehicle roof or the cargo area. In one type of hitch step, the hitch step is fabricated of steel and a step body or tread surface is simply tack-welded to a post that in turn is inserted into the trailer hitch receiver. Applicant developed another kind of hitch step that is injection-molded from a stiff but resilient thermoplastic elastomer (TPE). An example of this hitch step can be found in U.S. Pat. No. 9,145,035 B2, owned by the Applicant.

Applicant has also machined hitch steps from solid billets of aluminum that are similar in appearance to its TPE hitch steps. More recently, Applicant has developed reinforced TPE hitch steps in which the step body is as much as 24 inches wide, masking a larger portion of the rear bumper of the vehicle from the possibility of rear end collisions and offering enhanced access to the vehicle roof. However, issues have arisen when attempting to machine an all-metal version of these transversely extended hitch steps. Not the least among these is the amount of metal that is wasted when such a hitch step is machined out of a single billet. It would be desirable to reduce this waste, while at the same time continuing to produce a machined metal hitch step with excellent structural integrity.

SUMMARY OF THE INVENTION

According to one aspect of the invention, a trailer hitch step assembly is provided that has two main parts: a step body and a post. The post is disposed on a front-to-rear axis and has a rear portion and a front portion. The front portion is adapted to be affixed to a vehicle trailer hitch. The rear portion is fitted into a socket made in the step body.

The rear portion of the post has a top, a bottom, a left side, a right side and a rear surface. Each of these includes a respective planar facet. The facets of the left and right sides and the rear surface are vertical while the planar facet of the top is horizontal. The socket of the step body has a rear portion with a closed rear end, a ceiling, a left sidewall and a right sidewall, and these surfaces closely conform to the rear surface, top, left side and right side, respectively, of the rear portion of the post.

An upper surface of the step body is upwardly displaced from the socket ceiling. A first fastener bore downwardly extends from the top of the rear portion of the post. A second fastener bore, in alignment with the first fastener bore, upwardly extends from the socket ceiling into the step body. A first fastener is received in the first and second fastener bores to affix the post to the step body.

In one embodiment, a height of the front portion of the post is greater than a height of the rear portion of the post. In this embodiment, the length of the second fastener bore is greater than the difference between the step body height (as measured in an axial vertical plane) and the height of the front portion of the post. The rear portion of the post is therefore downwardly stepped so that the second fastener bore will terminate in a closed end in the step body. In another embodiment, a height between the top and bottom of the front portion of the post is substantially similar to a height between the top and bottom of the rear portion of the post.

In one embodiment, the assembly further includes a second fastener, which is received in a third fastener bore made in the rear portion of the post and a fourth fastener bore, aligned with the third fastener bore and made to upwardly extend from the socket ceiling. The third and fourth fastener bores are respectively axially spaced from the first and second fastener bores. In one embodiment, the first fastener bore extends all of the way from the bottom of the rear portion of the post to the top thereof, while the second fastener bore has a closed end and is threaded.

The post and the step assembly may be machined from separate billets of metal, such as aluminum. As affixed to each other, the planar facets of the post and step assembly cooperate to offer exceptional resistance to step body-post separation caused by torsional forces around the front-to-rear axis, a side-to-side axis or a vertical axis.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
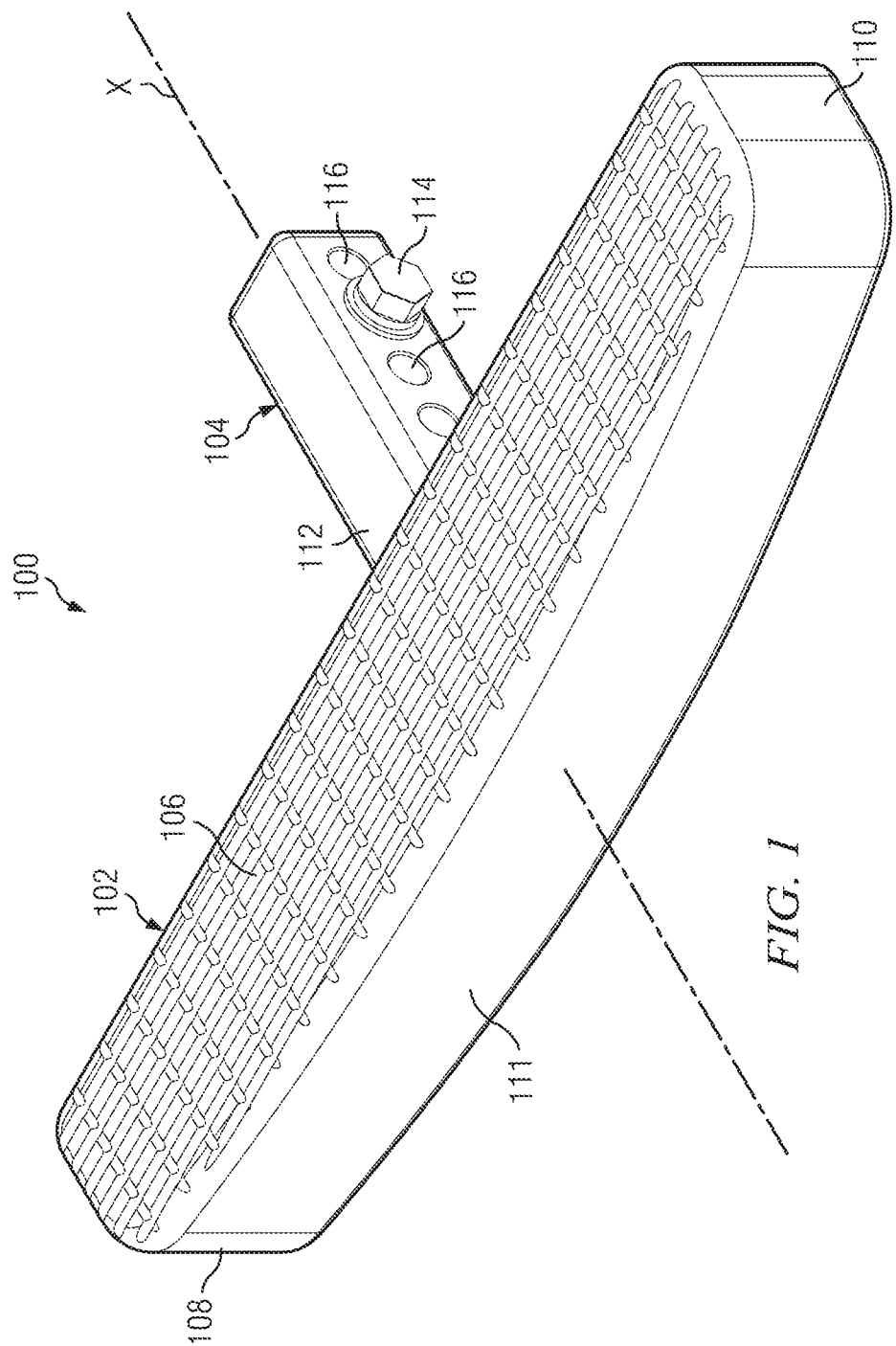
FIG. 1 is a top rear perspective view of a first embodiment of a trailer hitch assembly according to the invention.

A first embodiment of the invention is illustrated in FIGS. 1-5. With reference to FIG. 1, a hitch step assembly indicated generally at 100 includes a step body 102 and a post 104. The post 104 is disposed on a longitudinal or front-to-rear axis X. Step body 102 is disposed transversely to axis X, i.e., it is aligned to a y axis (see FIG. 5). In the illustrated embodiment, the step body 102 has an upper or tread surface 106 that substantially conforms to a horizontal plane. The upper surface 106 is upwardly displaced from axis X. In this embodiment, a width of the step body 102, from a left transverse end 108 to a right end 110, may be 24 inches. For ease in machining, a rear surface 111 of the step body may be vertical.

A front portion 112 of the post 104 is adapted to be inserted into a standard trailer hitch receiver (not shown). Conventional North American trailer hitch receivers are hollow square tubes aligned on a front-to-rear axis and an internal diameter of one popular size of them is a little more than two inches. Hence, front portion 112 has a square cross-section with a diameter of about two inches from side to side or top to bottom. An alternative embodiment (not shown) is meant to fit a standard light-duty trailer hitch having a diameter between its square sides of a little more than 1.25 inches. Once the front portion is inserted into the trailer hitch receiver, it is bolted into place with the aid of a bolt 114. The bolt 114 is inserted through a hole in the trailer hitch receiver, a selected one of the holes 116 formed in the post front portion 112, and is then threaded into a nut 200 (FIG. 2) that is housed in a respective one of a series of polygonal nut receptacles 300 (FIG. 3). Alternatively, a pin (not shown) is inserted through a hole in the trailer hitch receiver and a selected one of the holes 116, and is retained by a wire clip (not shown).

Figure 2:
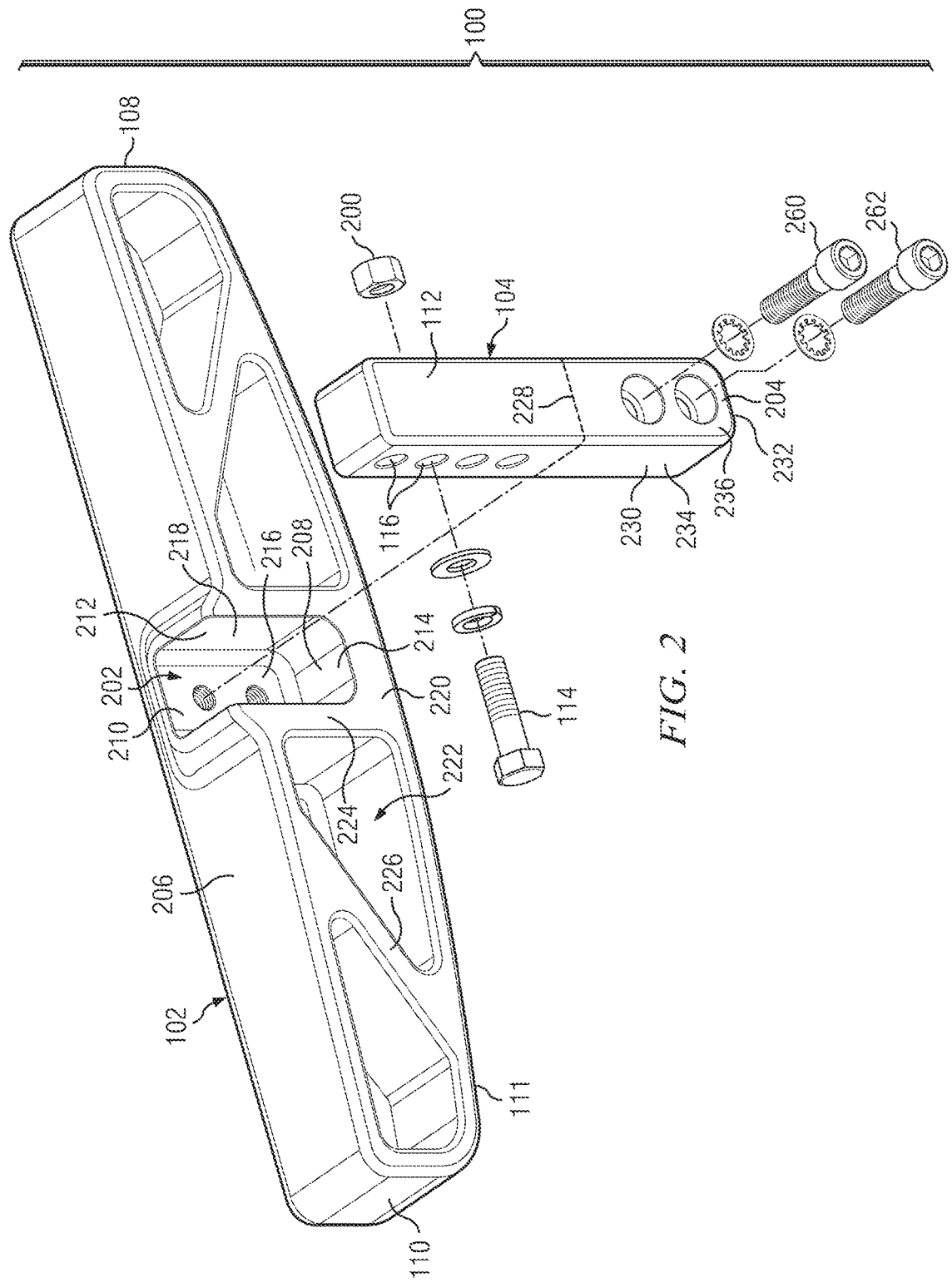
FIG. 2 is a bottom front exploded view of the embodiment shown in FIG. 1.
Figure 3:
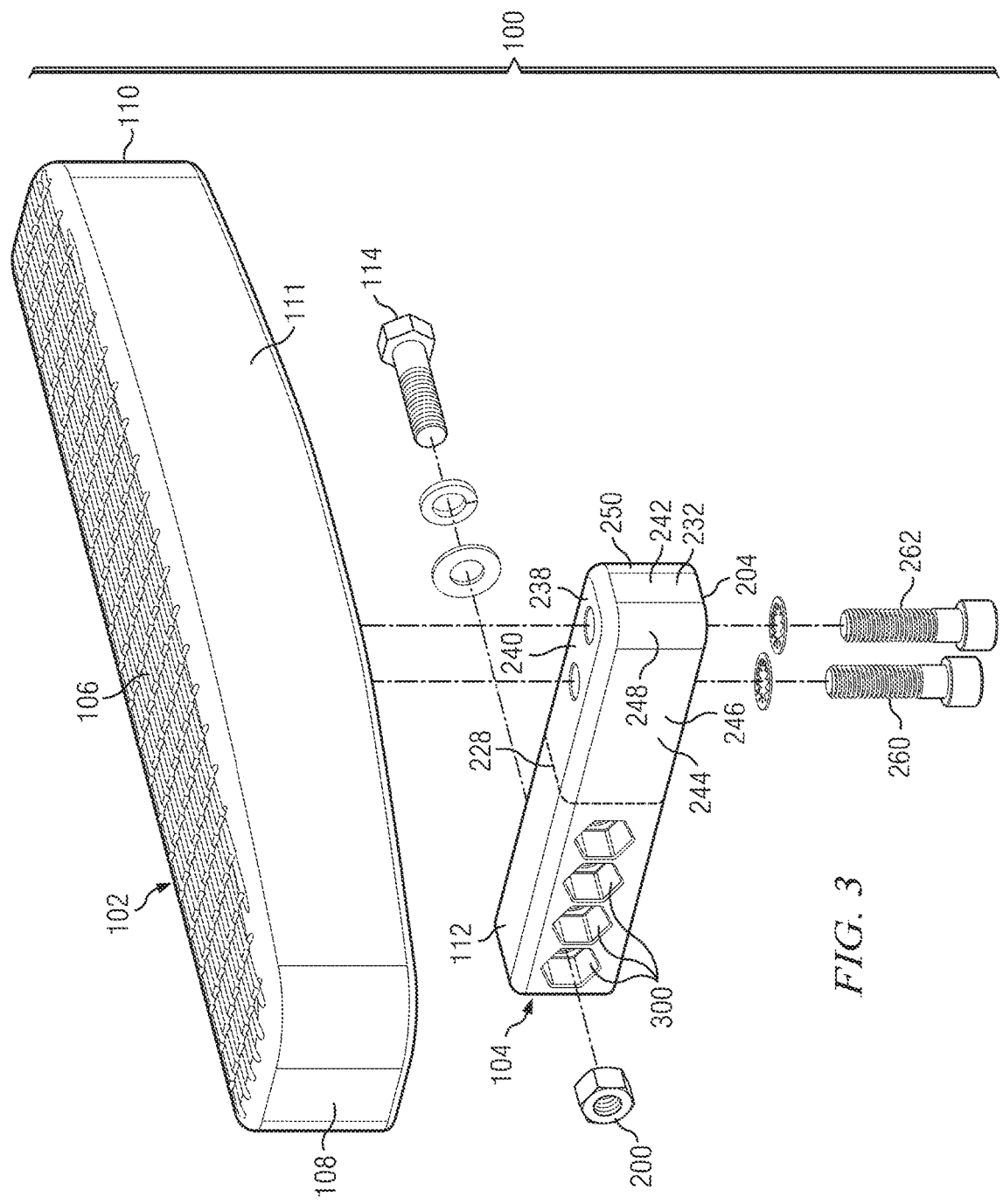
FIG. 3 is a rear exploded view of the embodiment shown in FIG. 1.

As seen in FIG. 2, the step body 102 has a socket 202 that receives a rear portion 204 of the post 104. The socket 202 generally is disposed on the X axis and proceeds rearwardly from a front surface 206 of the step body 102—with "front" meaning "facing the rear of the vehicle." The socket 202 terminates in a rear surface or rear end 208 that is closed. Socket 202 has a ceiling 210 that is downwardly spaced from the upper surface 106 (FIG. 1) of the step body and extends rearwardly from front surface 206 to socket rear surface 208. A left side wall 212 of the socket 202 is joined to the ceiling 210 and extends rearwardly from step body front surface 206 to socket rear surface 208. A right side wall (not visible in this FIGURE) is a mirror image of and is transversely spaced from the left side wall, is joined to the socket ceiling 210, and extends rearwardly from step body front surface 206 to socket rear surface 208.

The surfaces making up the walls of the socket 202 each include a planar facet. The rear surface 208 includes a vertical planar end facet 214 that is transversely oriented in a yz plane, where the z direction is vertical and the y direction is transverse, side-to-side or inboard-outboard. The ceiling 210 has a planar facet 216 that is in a horizontal or xy plane. The left side wall 212 has a vertical planar facet 218 that is longitudinally oriented in an xz plane. The right side wall (not visible here) has a similar planar facet 500 (FIG. 5) that is longitudinally oriented in an xz plane.

The socket planar facets 214, 216, 218 and 500 may be joined to each other by concave curved transitions, as shown, or alternatively may be joined to each other by abrupt corners. Each of the planar facets 214, 216, 218 and 500 should occupy most of the rear surface, ceiling or side wall of which they respectively are a part.

In the illustrated embodiment, the socket 202 is open to the bottom 220 of the step body 102. In the illustrated embodiment, the step body 102 has been cored out so that much of its interior is hollow. The step body may have a right hollow cell 222 bounded by a right socket wall 224 on its inboard side and crossed by a diagonal reinforcing rib 226 that is vertically oriented and proceeds from a point near rear surface 111, forwardly and inboard to a point proximate to front surface 206. The left half of the step body 102 may be a mirror image of the right half.

In this embodiment, the post 104 has a uniform square cross section in both its front portion 112 and its rear portion 204, such that the division 228 between the two is indistinct. An embodiment in which this is not the case will be described below. The rear portion 204 has a right side 230 that extends from a rear end 232 to a front end of the rear portion 204, here being the same as boundary 228. Most of the right side 230 is constituted by a planar facet 234 that resides in an xz plane. The top, rear and side surfaces of post rear portion 204 closely conform to the ceiling, closed end and side walls of the socket 202. In the illustrated embodiment, the post rear portion 204 has a bottom 236 that mostly conforms to an xy plane, and a height of the front portion 112 and the height of the rear portion 204 are substantially the same.

With reference to FIG. 3, the rear portion 204 of the post 104 has a top 238 that frontwardly extends from post rear end 232 to the front end 228 of post rear portion 204. Most of the top 238 is made up by a horizontal planar facet 240. Most of the surface of the post rear end 232 is constituted by a vertical planar end facet 242 that occupies a yz plane. A left side 244 of the post rear portion 204 extends forwardly from rear end 232 to the front end 228 of post rear portion 204. Most of the left side 244 is constituted by a vertical planar facet 246 that occupies an xz plane.

In the illustrated embodiment, the planar facets 234, 240, 242 and 246 are connected to each other by convex curved transitions, but could instead be connected by abrupt corners. In the illustrated embodiment, a convex surface 248, of a relatively large radius in an xy plane, connects rear end facet 242 with left side facet 246, and a similar convex surface 250 connects rear end facet 242 with right side facet 234. The enhanced radii of the concave curved surfaces corresponding to surfaces 248 and 250 and connected to socket end facet 214 are meant to reduce stress at these corners, add strength, and make the structure easier to machine.

Figure 4:
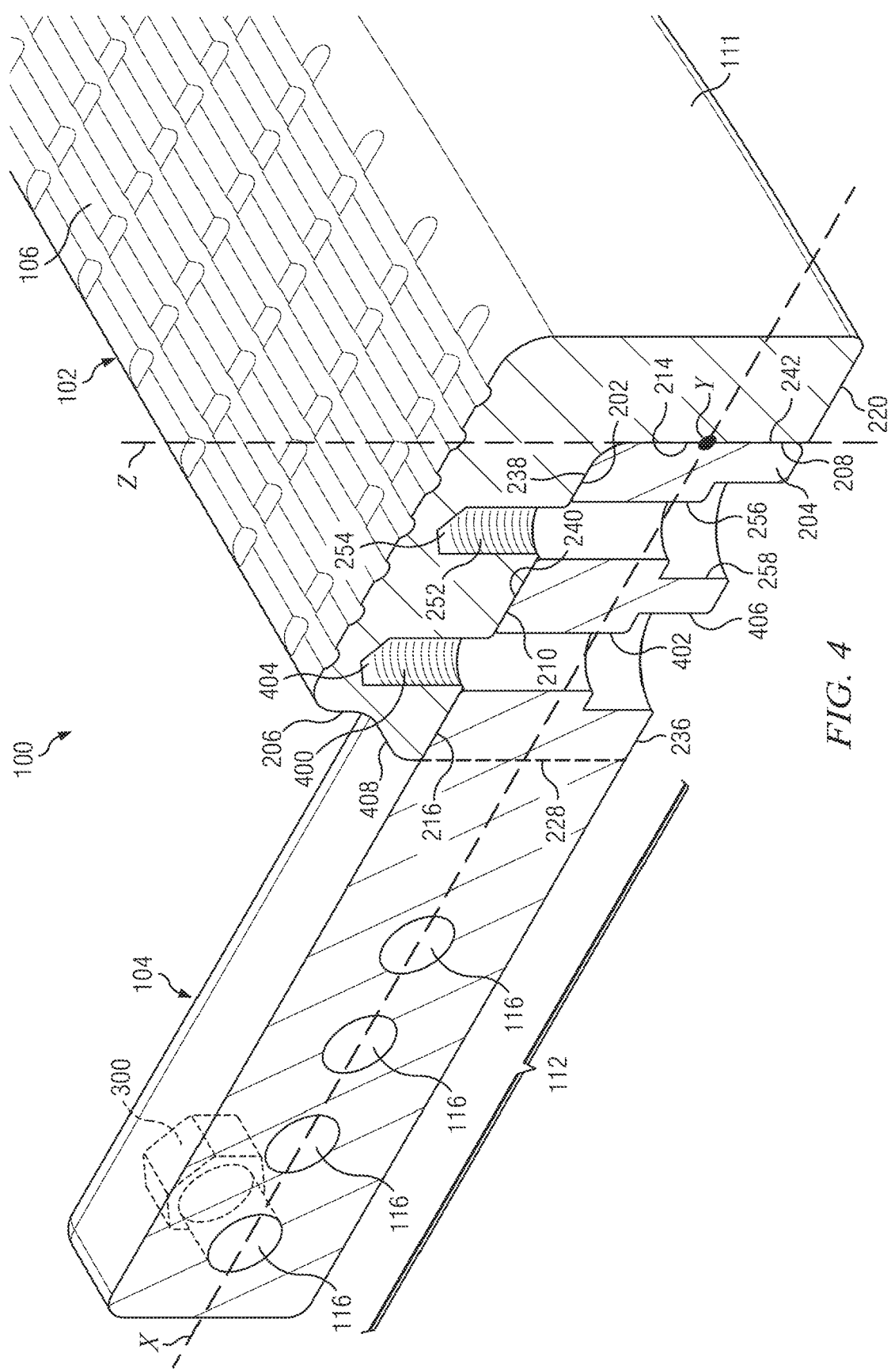
FIG. 4 is a vertical axial sectional view of the embodiment shown in FIG. 1.

Referring to FIG. 4, the top 238 of the post rear portion 204, and the socket ceiling 210 to which top 238 is closely fitted, are downwardly spaced by a considerable distance from the upper surface 106 of the step body 102. This permits an upward extension of a threaded bore 252 from the socket ceiling 210. The length of bore 252 from the socket ceiling 210 to its closed end 254 is less than the distance between socket ceiling 210 and step body upper surface 106. A bore 256 extends from the bottom 236 of the rear portion 204 of the post to the top 238 of the rear portion of the post. The bore 256 is in alignment with bore 252 once post 104 is fitted to socket 202, and in the illustrated embodiment bores 252 and 256 are vertical and are positioned on an xz plane that includes the X axis. The bore 256 may have a countersink 258 in order to accommodate the enlarged head of a fastener, such as a cylindrical socket head cap screw 260 (FIGS. 2 and 3).

In the illustrated embodiment, the post 104 is joined to the step body 102 with the aid of a second set of bores 400, 402 and a second fastener, such as a cylindrical socket head cap screw 262 (FIGS. 2 and 3). Bore 400 is threaded, has a closed end 404 and extends upwardly from socket ceiling 210. Bore 400 is axially spaced from bore 252. Bore 402 extends downwardly from top 238 of post rear portion 204 to the bottom 236 of the post rear portion 204. Bore 402 is in alignment with bore 400, and in the illustrated embodiment, both are vertical and are disposed on an xz plane that includes the X axis. Bore 402 may be countersunk at 406 to house an enlarged end of the second fastener, such as cylindrical socket head cap screw 262.

In this illustrated embodiment, the step body 102 has a height, measured from top surface 106 to bottom 220 in an xz plane that includes axis X, which is much greater than a height measured from the post rear portion top 238 to the post rear portion bottom 236. This means that there will be ample vertical spacing between socket ceiling 210 and top surface 106, and that in turn permits a substantial length of threaded bores 252, 400 to be housed in body 102 without opening onto the upper step body surface 106.

In the illustrated embodiment, the front surface 206 is not entirely in a vertical plane but has a forwardly extending reinforcing collar 408 that extends around the entrance of socket 202. The collar 408 may have a surface that slopes from rear to front and toward axis X.

In the illustrated embodiment, and as considered in an xz plane including axis X, the bottom 220 of the step body 102 may be collinear with the bottom 236 of the rear portion of the post. But, as seen in FIG. 5, the bottom 220 of the step body 102 may be upwardly feathered as a function of its distance from the axis X, such that the overall height of the step body 102 at its ends 108, 110 is smaller than the overall height of the step body 102 taken at its middle.

Figure 5:
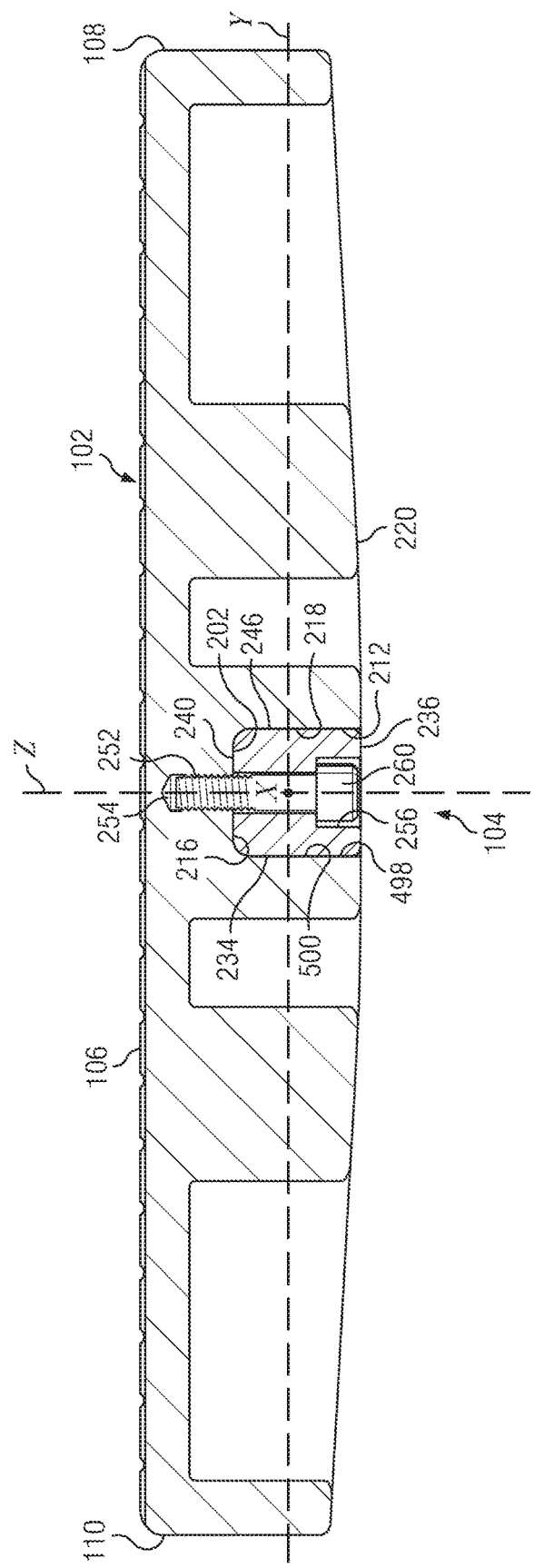
FIG. 5 is transverse vertical sectional view taken at 90 degrees to the sectional view shown in FIG. 4.
Figure 6:
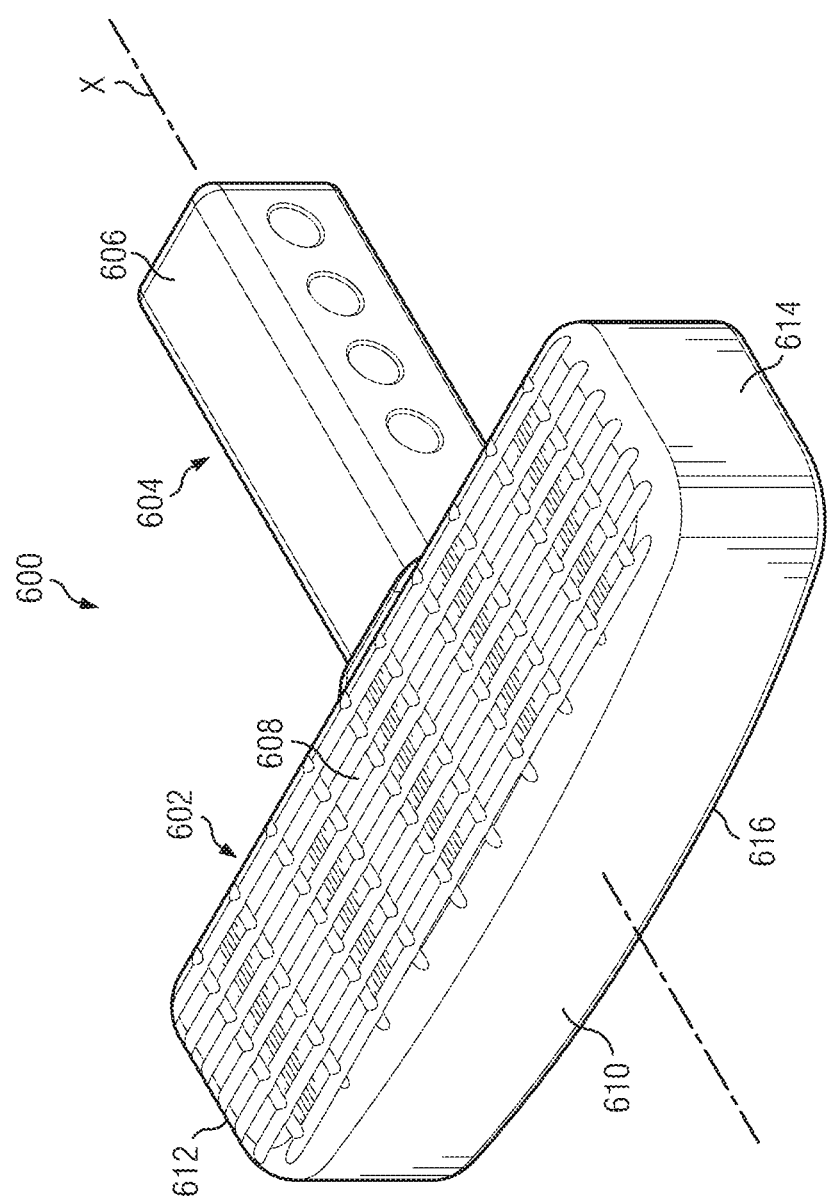
FIG. 6 is a top rear perspective view of a second embodiment of a trailer hitch assembly according to the invention.

FIG. 5 is a transverse sectional view, looking to the rear and taken through bores 252 and 256 and cap screw 260. When a downward force is placed on an end of the step body 102 (say, end 108), the coaction of the planar facets of the socket 202 and the rear portion 204 of the post will aid in resisting torque around axis X. In this scenario, downward force on left end 108 (as applied by a heavy man stepping on end 108) will have a tendency to urge end 108 downward and displace end 110 upward, twisting around axis X. The abutment of the upper portion of socket right sidewall planar facet 500 with the upper portion of post right sidewall planar facet 234, and the abutment of the lower portion of left socket sidewall planar facet 218 with the lower portion of left post sidewall planar facet 246, will resist the separation of the step body 102 from the post 104 due to this torque. In a similar fashion, the coaction of the upper portions of planar facets 218, 246 and the coaction of lower portions of planar facets 234, 500 will resist separation of the step body 102 from the post 104 if a downward force (as applied by a heavy man) is placed on step body end 110.

The close conformation of the planar facets of socket 202 to the planar facets of post rear portion 204 will also resist the separation of step body 102 from post 104 in the event of a frontward impact imposed at step end 108 or at step end 110. For example, if a frontward impact is experienced at right step end 110, the step body 102 will be urged to twist in an xy plane such that right step end 110 is pushed forward and left step end 108 is displaced rearward. The socket 202 will be urged to cam off of and separate from the rear portion 204 of the post 104. This tendency will be resisted by the contact of the forward portion of right socket planar facet 500 with the forward portion of right post planar facet 234, and the contact of the rearward portion of left socket planar facet 218 with the rearward portion of left post planar facet 246. In a similar fashion, the coaction of forward portions of facets 218, 246 and rearward portions of facets 500, 234 will resist separation of step body 102 from post 104 if a forward impact is imposed at left step end 108. The close conformance of the planar facets of post rear portion 204 to the planar facets of socket 202 thus resists torque around the X axis and also around a Z axis passing through body 102 and the rear portion 204 of post 104.

Finally, and also with reference back to FIG. 4, the close conformance of the post rear portion 204 to the socket 202 will aid in resisting torque around a Y axis, such as one located to be coplanar with axis X and located in the plane of end facet 242. For example, a heavy man could step on surface 106 near its juncture with step body rear surface 111. When this happens, the step body 102 will be urged to rotate clockwise as seen in this Figure, camming off of and separating from the rear end 204 of the post 104. This tendency will be resisted by the abutment of the rearward portion of post horizontal facet 240 with the rearward portion of socket ceiling facet 216, and the abutment of the lower portion of post rear end facet 242 with socket end facet 214. Because the torque will tend to be experienced at a fulcrum at the junction of the rear of socket ceiling 210 with the rear socket surface 208, the tension on cap screw 262 as it engages threaded bore 400 will be reduced.

The resistance to separation due to torque forces is enhanced because the entireties of the planar facets of the post rear portion 204 are in abutment with and are coextensive with corresponding planar facets of the socket 202. In particular, the lower ends of each vertical post facet 234, 246, 242 abut respective lower ends of vertical socket facets 500, 218 and 214. Said another way, the heights or vertical lengths of the vertical socket facets 500, 218, 214 are at least as great as the heights or vertical lengths of the post rear portion facets 234, 246 and 242.

FIGS. 6-10 depict a second embodiment of the invention. A trailer hitch step assembly indicated generally at 600 is formed of two main parts: a step body 602, disposed transversely of a trailer hitch receiver axis X, and a post 604, disposed along axis X. A front portion 606 of post 604 is adapted for insertion into and affixation to a standard square hollow trailer hitch receiver (not shown) and is identical to front portion 112 of post 104. Step body 602 has a top or tread surface 608 and a rear surface 610 that extends between a left end 612 and a right end 614. The rear surface 610 can be vertical for ease in machining. Rear surface 610 may be somewhat convex as viewed from the rear. The step body 602 is much less wide than step body 102 and, with important ramifications as will be discussed below, its height between top surface 602 and a bottom 616, as measured in an xz plane including axis X, is significantly less than is the corresponding height of step body 102.

Figure 7:
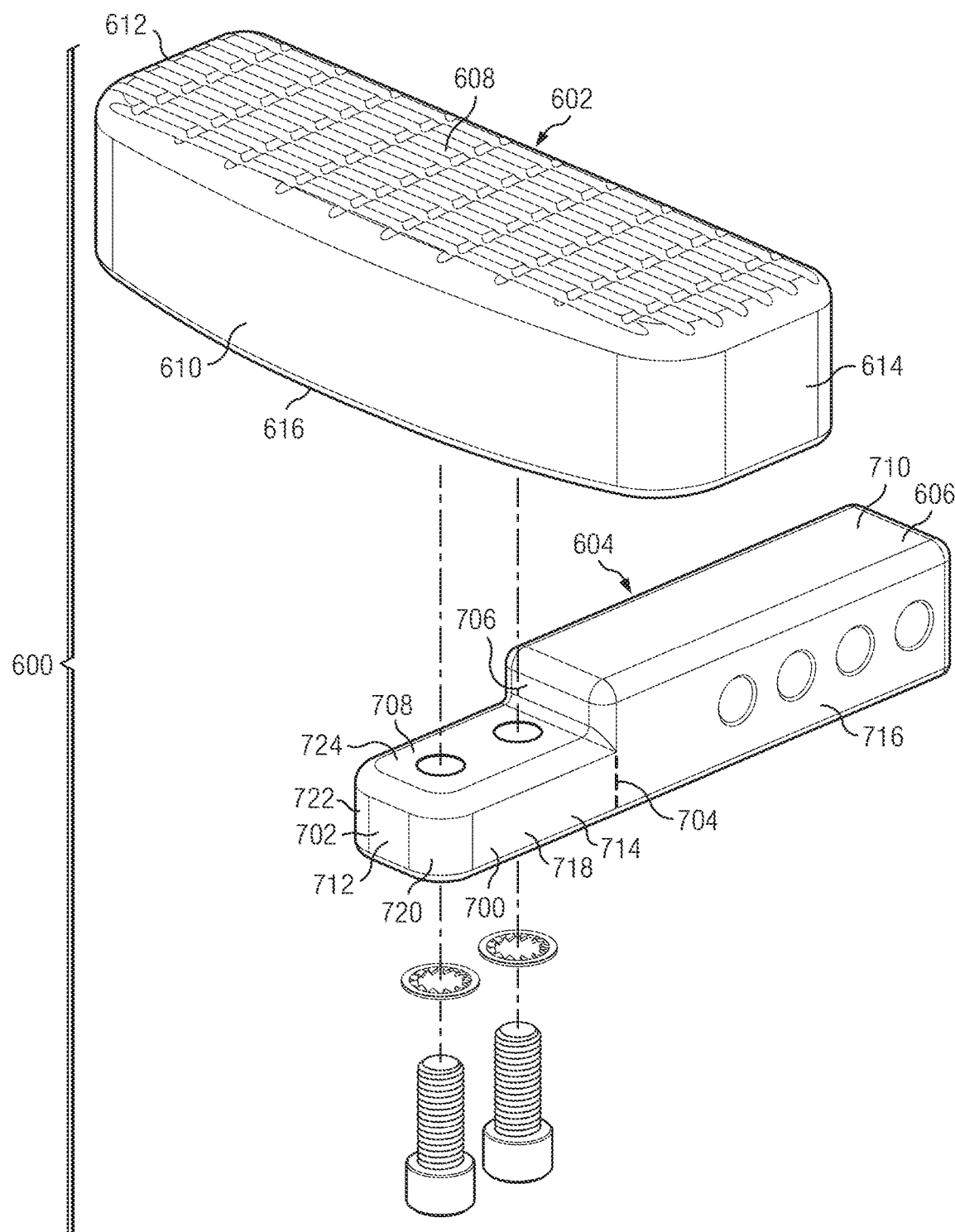
FIG. 7 is a top rear exploded view of the embodiment shown in FIG. 6.

As seen in FIG. 7, the post 604 has a rear portion 700 that extends from a rear surface or end 702 to a front end 704, where it joins post front portion 606. In this case, the junction or front end 704 is marked by a vertical step 706, generally conforming to a yz plane, that upwardly extends from a post rear portion top 708 to a post front portion top 710. The rear surface or end 702 is principally constituted by a planar vertical end facet 712. A right side 714 of post rear portion 700 may be coplanar with a right side 716 of post front portion 606 and is predominately constituted by a vertical facet 718 that resides in an xz plane. A convex surface 720 of somewhat enlarged radius joins the end facet 712 with the right side planar facet 718. Another convex surface 722 of somewhat enlarged radius joins the end facet 712 with a left side planar vertical facet 800 (FIG. 8).

The top 708 of post rear portion 700 is principally constituted by a horizontal planar facet 724. Horizontal facet 724 may be joined to right facet 718, to left facet 800 and to end facet 712 by curved transitions, as shown, or may make more abrupt corners with these vertical facets.

Figure 8:
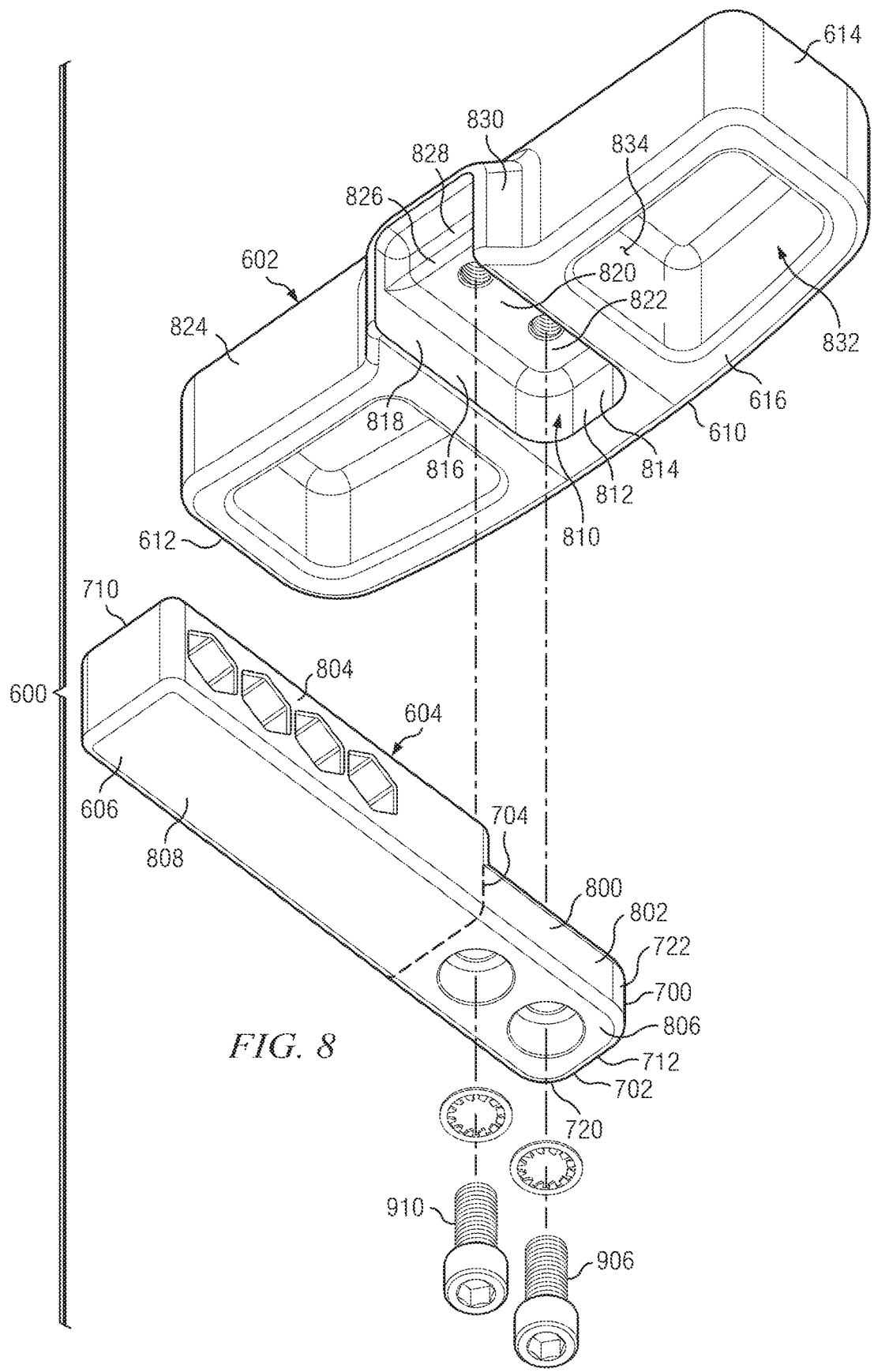
FIG. 8 is a bottom front exploded view of the embodiment shown in FIG. 6.

As best seen in FIG. 8, the left facet 800 makes up most of a post rear end left side 802. The post rear end left side 802 extends forwardly from post end surface 702 to the front end 704 of rear portion 700. The left side 802 may be substantially coplanar with a left side 804 of the post front portion 606. A bottom 806 of the post rear portion 700 may substantially conform to an xy plane, and forwardly extends from rear end 702 to front end 704. Bottom 806 may be substantially coplanar with a bottom 808 of the post front portion 606.

As before, the rear portion 700 of the post 604 is fitted into a socket 810 formed in the step body 602. A rear surface or closed end 812 of the socket 810 is predominately constituted by a planar facet 814 residing in a yz plane. A right sidewall 816 of the socket 810 is predominately constituted by a planar facet 818 residing in an xz plane. A ceiling 820 of the socket 810 is predominately constituted by a planar facet 822 residing in an xy plane. A left side wall 1000 (see FIG. 10) is predominately constituted by a planar facet 1002 residing in an xz plane. Right sidewall 816 and left sidewall 1000 extend forwardly from the closed end 812 to a front surface 824 of the step body 602. Ceiling 820 of the socket 810 forwardly extends from the closed end 812 to a transversely disposed corner 826. A front-facing plate 828 upwardly extends from corner 826 and substantially resides in a yz plane. The front-facing plate 828 is bounded at its left side, its right side and its top by a collar 830 that forwardly protrudes from the otherwise substantially planar front surface 824 of the step body 602.

The planar facets partially making up the surface of socket 810 may be joined together by concave curved transitions, as shown, or alternatively may join each other in more abrupt corners. The degree to which such transitions are radiused should match that of the corresponding curved transitions formed in the surface of post rear portion 700.

The left socket sidewall or surface 1000 may be separated from a hollow cell 832 formed in a left portion of the step body 602 by a longitudinally disposed vertical wall 834. The right portion of the step body may be a mirror image of the left portion. Cells 832 are machined out of body 602 to save weight and material.

Figure 9:
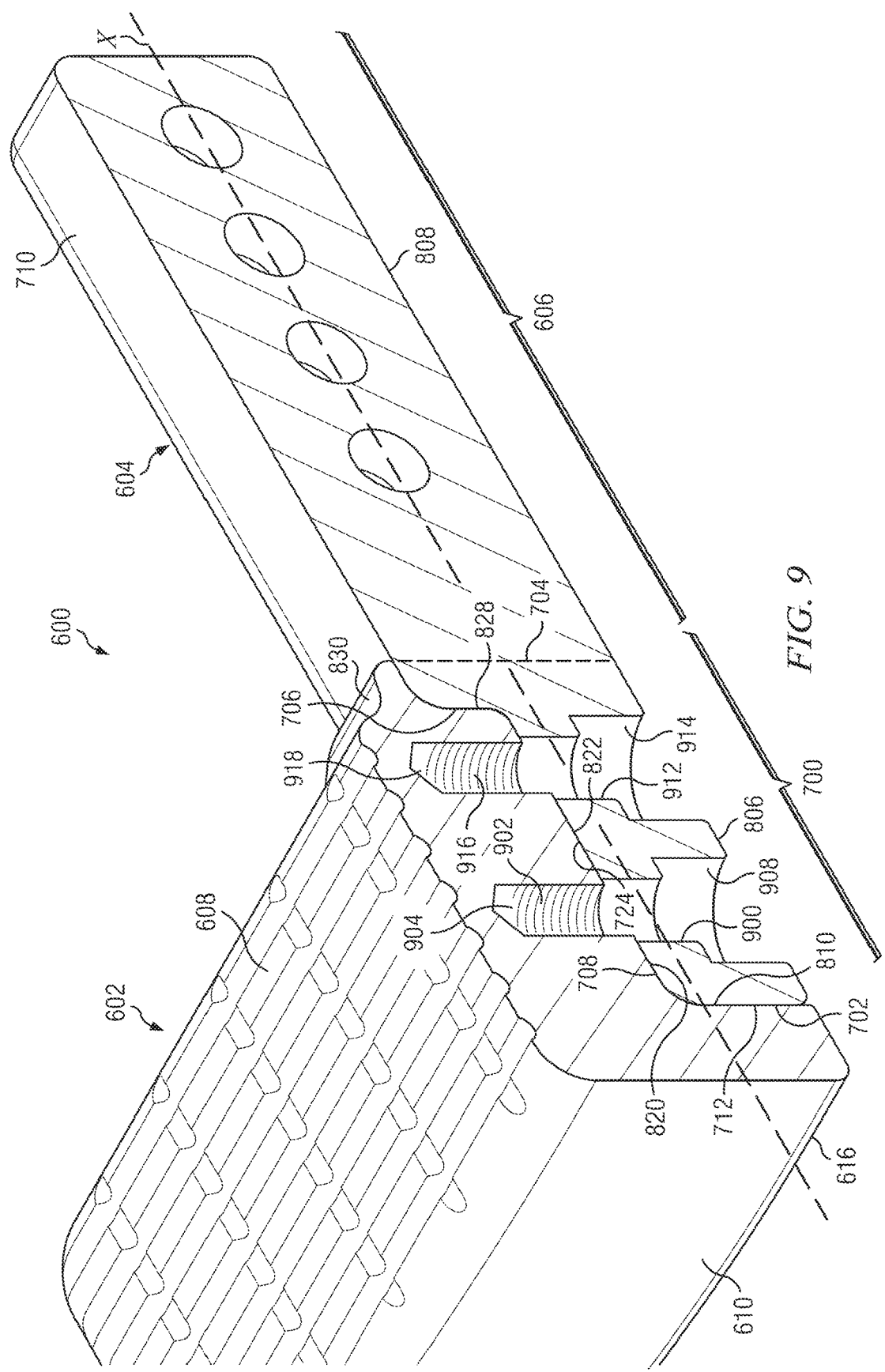
FIG. 9 is a vertical axial sectional view of the embodiment shown in FIG. 6.
Figure 10:
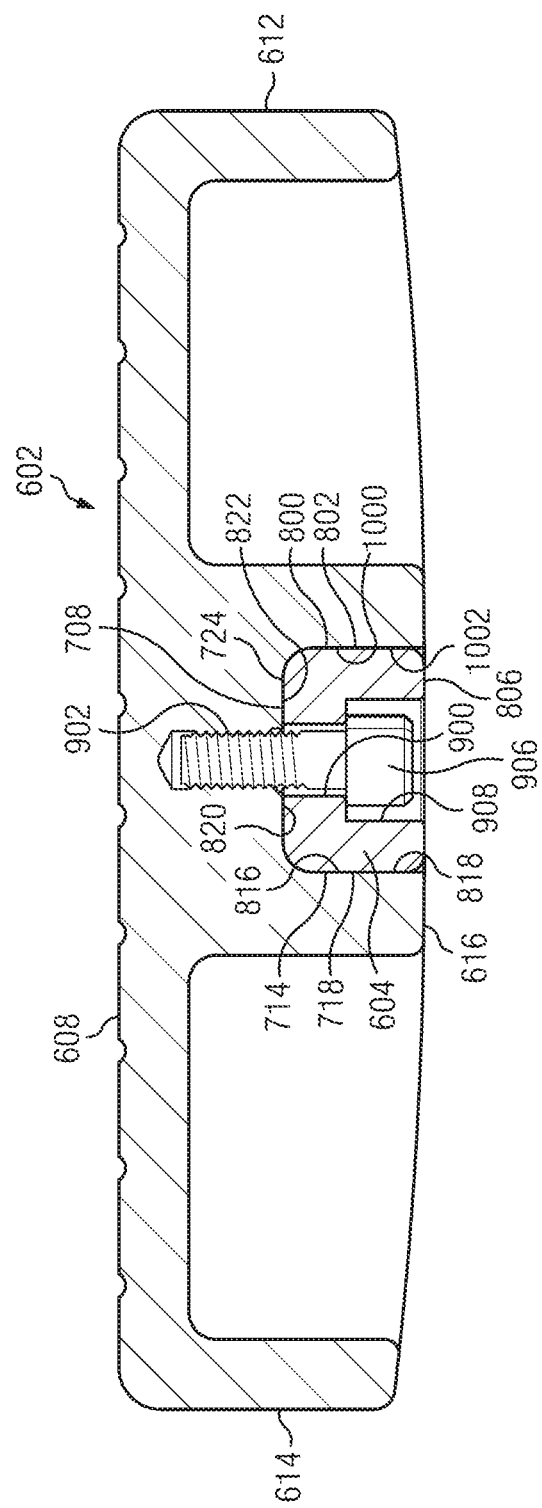
FIG. 10 is a vertical transverse sectional view taken at 90 degrees to the sectional view shown in FIG. 9.

Referring to FIG. 9, a bore 900 downwardly extends from top 708 of post rear portion 700 to bottom 806 of the post rear portion 700. Bore 900 is positioned on axis X and in this embodiment is vertical. A bore 902 upwardly extends from socket ceiling 820 to a closed end 904. Bore 902 is aligned with bore 900 and is threaded. A fastener 906 (see FIGS. 8 and 10), such as a cylindrical socket head cap screw, is inserted through bore 900 and is threaded into bore 902, affixing the post 604 to the step body 602. The bottom entrance to bore 900 may be countersunk at 908 to house an enlarged end of cap screw 906.

In the illustrated embodiment, a second fastener 910 (such as a cap screw; see FIG. 8) is also used in the affixation of the post 604 to the step body 602. To this end, a bore 912 extends downwardly from the top 708 of the post rear portion 700 to the bottom 806 of the post rear portion 700. Bore 912 is axially displaced from bore 900 and in this embodiment is vertical and resides in an xz plane including axis X. Bore 912 may be countersunk at 914 at its bottom to house an enlarged head of fastener 910. A further bore 916 extends upwardly from ceiling 820 of the socket 810 to a closed end 918. Bore 916 may be threaded and is aligned with bore 912.

Bores 902 and 916 must be long enough for enough of the threads of the screws 906, 910 to firmly fasten to the threads of bores 902 and 916. But, in this embodiment, a height in a vertical direction between step body top surface 608 and bottom 616 is reduced from the corresponding height of the embodiment shown in FIGS. 1-5, so that, without modification, there wouldn't be enough room above the post for the bores 902, 916. This problem is overcome by stepping down the post between the front portion 606 and the rear portion 700. As modified, the vertical spacing of socket ceiling 820 and top surface 608 is still large enough to permit blind bores 902, 916 to have sufficient threaded lengths to firmly affix the step body 602 to the post 604. In this embodiment, the height between the top 710 of the post front portion and the bottom 808 of the post front portion is substantially greater than a height between the top 708 of the post rear portion and the bottom 806 of the post rear portion, and a height of the bores 902 and 916 is greater than the difference between the step body height and the height of the front portion 606 of the post 604.

Similar to the first embodiment, the planar facets 712, 718, 724 and 800 of the post rear portion 700 coact with the corresponding planar facets 814, 818, 822 and 1002 of the socket 810 to resist the separation of step body 602 from post 604 due to torsional forces around x, y or z axes. This resistance is enhanced by the abutment of the entirety of each of the post rear portion planar facets 800, 718, 724 and 712 with coextensive socket planar facets 1002, 818, 822 and 814, respectively. In an xz plane including axis X, and as seen in FIG. 9, bottom 806 of the socket rear portion 700 may be substantially collinear with bottom 616 of the step body 602.

In summary, a novel two-part trailer hitch step assembly has been shown and described that can be machined from solid metal billets and which will resist separation into step body and post components due to torsional forces applied to the step body around x, y or z axes.

While illustrated embodiments of the present invention have been described and illustrated in the appended drawings, the present invention is not limited thereto but only by the scope and spirit of the appended claims.

I claim:

1. A trailer hitch step assembly comprising:

an elongate post disposed on a front-to-rear axis and having a rear portion and a front portion, a front end of the rear portion joined to the front portion, the front portion of the post adapted for affixation to a trailer hitch receiver of a vehicle, the rear portion of the post having a rear end rearwardly displaced from the front end, a left side of the rear portion extending from the rear end to the front end and including a vertical planar left facet, a right side of the rear portion transversely spaced from the left side and extending from the front end to the rear end, the right side including a vertical planar right facet, a rear surface of the rear portion joining the left side to the right side and having a vertical planar end facet, a top of the rear portion of the post joining the left side to the right side and extending from the rear end to the front end, the top including a horizontal planar top facet, a bottom of the rear portion of the post joining the left side to the right side and extending from the rear end to the front end, the rear portion of the post having a post rear portion height between the bottom and the top;

a step body having a front surface, a socket rearwardly extending from the front surface to a closed rear end, a rear portion of the socket forwardly extending from the closed end, a ceiling of the rear portion of the socket closely conforming to the top of the rear portion of the post, a top surface of the step body upwardly spaced from the ceiling, a left sidewall of the rear portion of the socket downwardly extending from the ceiling, having a height at least as great as the post rear portion height, and closely conforming to the left side of the rear portion of the post, a right sidewall of the rear portion of the socket downwardly extending from the ceiling, having a height at least as great as the post rear portion height, and closely conforming to the right side of the rear portion of the post, the closed rear end of the rear portion of the socket closely conforming to the rear surface of the rear portion of the post; and the rear portion of the post having a first fastener bore downwardly extending from the top of the rear portion of the post, the step body having a second fastener bore upwardly extending from the ceiling of the rear portion of the socket and in alignment with the first fastener bore, a first fastener received in the first and second fastener bores to affix the post to the step body.

2. The assembly of claim 1, wherein the rear portion of the post has a third fastener bore downwardly extending from the top of the rear portion of the post and being axially spaced from the first fastener bore, the step body having a fourth fastener bore upwardly extending from the ceiling of the socket, axially spaced from the second fastener bore, and in alignment with the third fastener bore, a second fastener received in the third and fourth fastener bores to affix the post to the step body.

3. The assembly of claim 1, wherein the first fastener bore extends from the bottom of the rear portion of the post to the top of the rear portion of the post, the second fastener bore having a closed end and being threaded.

4. The assembly of claim 3, wherein the first fastener is a screw with an enlarged head, the second fastener bore being countersunk at the bottom of the rear portion of the post to house the enlarged head of the screw.

5. The assembly of claim 1, wherein the step body has a bottom, the bottom of the step body being substantially collinear with the bottom of rear portion of the post in a vertical plane including the axis.

6. The assembly of claim 1, wherein the front portion of the post has a top and a bottom, a height of the front portion of the post measured between the top and the bottom of the front portion of the post being substantially greater than the height of the rear portion of the post, the step body having a bottom and a step body height measured in a vertical plane between the top surface of the step body and the bottom of the step body, the second fastener bore having a length which is greater than the difference between the step body height and the height of the front portion of the post.

7. The trailer hitch assembly of claim 1, wherein the front portion of the post has a top and a bottom, a height of the front portion of the post between the top of the front portion of the post and the bottom of the front portion of the post being substantially greater than the height of the rear portion of the post, the post having a rearward-facing vertical step at the front end of the rear portion of the post, the vertical step joining the top of the rear portion of the post to the top of the front portion of the post.

8. The assembly of claim 1, wherein the front portion of the post has a top and a bottom, a height of the front portion of the post measured between the top of the front portion of the post and the bottom of the front portion of the post being substantially similar to the height of the rear portion of the post.

9. The assembly of claim 1, wherein the end facet of the post is joined to the right facet of the post by a first convexly curved end surface, and wherein the end facet of the post is joined to the left facet of the post by a second convexly curved end surface.

10. The assembly of claim 1, wherein the step body and the post are machined from solid blocks of metal.

11. The assembly of claim 10, wherein the metal is aluminum.

12. The assembly of claim 1, wherein the socket ceiling has a horizontal planar facet coextensive with and abutting the horizontal planar top facet of the post rear portion, the right sidewall of the socket having a right vertical planar facet coextensive with and abutting the vertical planar right facet of the post rear portion, the left sidewall of the socket having a left vertical planar facet coextensive with and abutting the vertical planar left facet of the post rear portion, the closed rear end of the socket having a vertical end facet that is coextensive with and abuts the vertical planar end facet of the post rear portion.

\* \* \* \* \*